United States Patent [19]

Ditman, Jr.

[11] Patent Number: 4,921,335
[45] Date of Patent: May 1, 1990

[54] OPTICAL PHASE CONJUGATE BEAM MODULATOR AND METHOD THEREFOR

[75] Inventor: L. Samuel Ditman, Jr., Westminster, Md.

[73] Assignee: The United States of America as represented by the Secretary of the Navy, Washington, D.C.

[21] Appl. No.: 239,498

[22] Filed: Sep. 1, 1988

[51] Int. Cl.$^5$ .............................................. G02F 1/35
[52] U.S. Cl. ................................................... 350/354
[58] Field of Search ..................... 350/354, 3.67, 3.68, 350/3.64; 372/21, 22

[56] References Cited

U.S. PATENT DOCUMENTS

| | | | |
|---|---|---|---|
| 4,005,935 | 2/1977 | Wang | 356/5 |
| 4,233,571 | 11/1980 | Wang et al. | 331/94.5 C |
| 4,493,085 | 1/1985 | Valley | 350/355 X |
| 4,496,222 | 1/1985 | Shah | 350/354 |
| 4,529,273 | 7/1985 | Cronin-Golamb et al. | 350/354 |
| 4,673,257 | 6/1987 | Rokni et al. | 350/354 |
| 4,768,846 | 9/1988 | Connors et al. | 350/354 X |
| 4,778,261 | 10/1988 | Boyd et al. | 350/354 |

OTHER PUBLICATIONS

Anderson et al., "Self-Pumped Phase Conjugation in BaTiO$_3$ at 1.06 μm", *Optics Letters*, vol. 10, No. 12, Dec., 1985, pp. 627–628.

Primary Examiner—Eugene R. LaRoche
Assistant Examiner—Nathan W. McCutcheon
Attorney, Agent, or Firm—Kenneth E. Walden; Jacob Shuster

[57] ABSTRACT

The present invention relates to the modulation of a phase conjugate beam. A writing beam is directed incident to a phase conjugate reflector. A modulating beam is also directed incident to the phase conjugate reflector for amplitude modulation of the phase conjugate beam. The modulating beam can also be steerable for effecting the amplitude of the phase conjugate beam according to spatial distribution so as to spatially modulate the phase conjugate beam. The phase conjugate modulation thus can be accomplished by opto-optical means and without modulation of or effect on the incident writing beam.

9 Claims, 1 Drawing Sheet

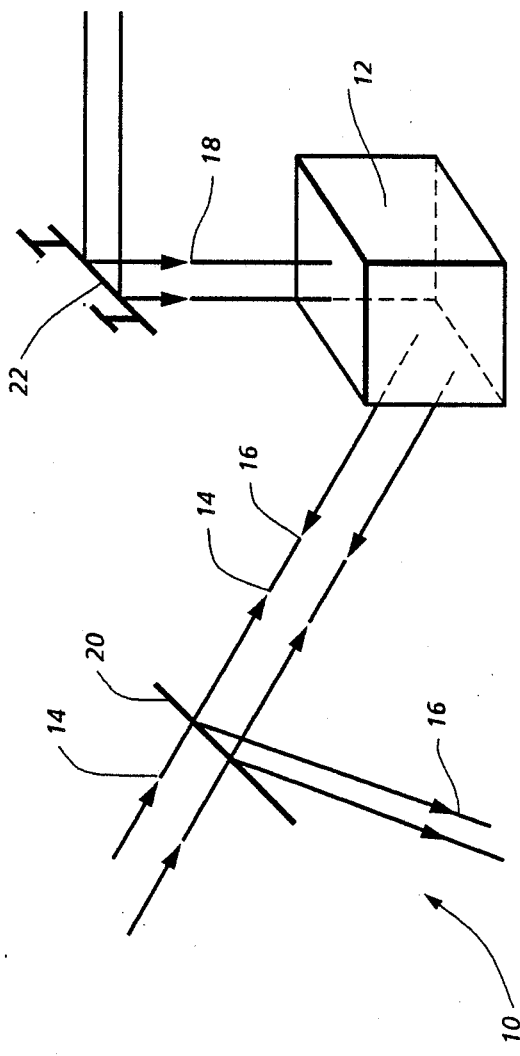
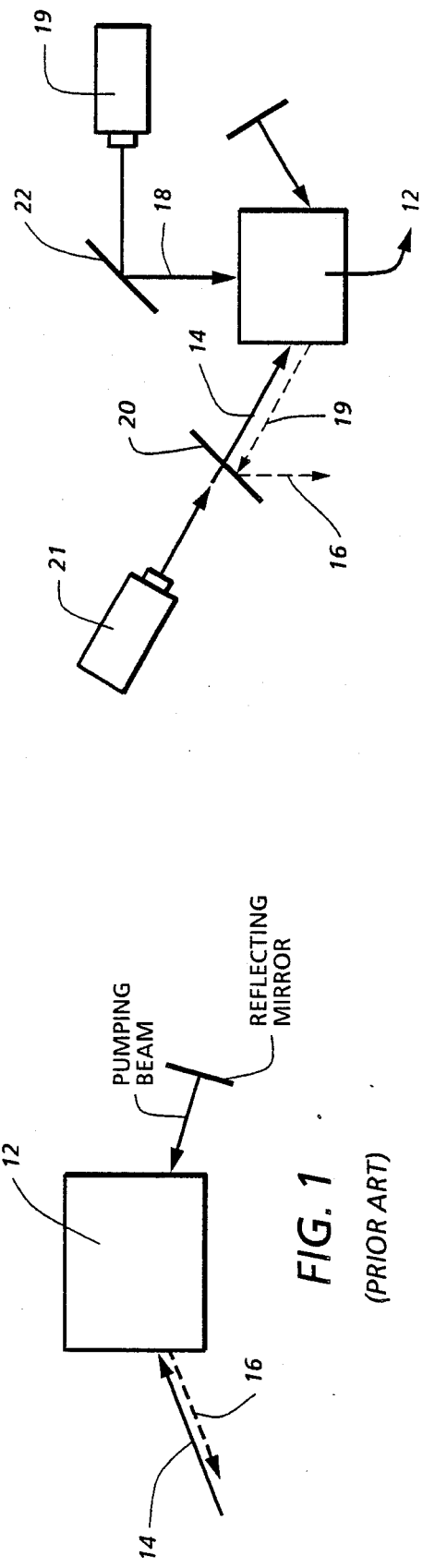
FIG. 3
FIG. 2
FIG. 1
(PRIOR ART)

4,921,335

OPTICAL PHASE CONJUGATE BEAM MODULATOR AND METHOD THEREFOR

BACKGROUND OF THE INVENTION

The present invention relates to phase conjugate beams and more particularly to the modulation of phase conjugate beams.

A phenomenon resulting from nonlinear optical mixing is called "phase conjugation" which results from the use of nonlinear techniques for real time processing electromagnetic fields. Phase conjugation is a term which describes a phenomenon involving reversal of the direction of propagation together with a sign reversal of the phase factor. Regardless of the relative orientation of the device and the incident light beam, the reflected conjugate light beam exactly retraces the path of the incident beam. However, there may be a range of particular relative orientations of the device and incident light beams for optimum phase conjugate reflectivity and sensitivity. In addition, a sign reversal of the phase factor (phase reversal) of the incident beam is accomplished. Phase conjugation is sometimes referred to as wavefront reversal.

The properties of the conjugated beam are such that as the wave propagates, the phase of the conjugated beam undergoes a time reversal with respect to the phase properties of the incoming or incident beam. As the conjugate beam propagates away from the nonlinear medium, its phase condition is substantially identical with the phase condition of the incoming beam at the same distance from the nonlinear medium along their respective optical paths. The phase conjugator causes an incoming ray to be "reflected in the phase conjugate sense", to have its propagation vector (or K-vector) inverted such that the incident ray exactly returns upon itself. If a phase aberrator is placed between the source and the phase conjugator, upon the waves retraversal of the aberrator on the way back to the source, the returning wave will have the same beam quality returned at the source as it did when it left the source.

By example and not by limitation, examples of methods for producing optical phase conjugation are four-wave mixing, three-wave mixing, saturated resonances, stimulated Brillouin scattering (or SBS device), stimulated Raman scattering, and photon echo.

In four-wave mixing, also known as degenerate four wave mixing, if al of the beams have the same frequency, the incident incoming beam is mixed with a pair of pump beams and a fourth output beam which is the phase conjugate of the incoming or incident beam, is generated within the nonlinear medium. The two pump beams, emitted either by two external lasers of identical frequency or by one laser with beam splitting optics, produce coherent optical beams which are incident upon a nonlinear medium from opposite directions. An appropriate phase hologram is set up in the medium by the interaction of the two pump waves and an incoming wave incident upon the medium. The incoming wavefront incident upon the pumped medium is reflected as a phase conjugate waveform. Alternately, use of an appropriate absorbing or amplifying medium allows for amplitude holograms to be set up in the medium which results in the phase conjugation process.

In three-wave mixing, commonly known as parametric down-conversion, the incoming wavefront is incident upon the nonlinear medium. Additionally, an external laser emits a pumping beam having twice the frequency component of the incoming beam and is also made incident upon the nonlinear medium from the same direction. The interaction of the waves and the nonlinear medium produce the phase conjugate waveform of the incoming beam to be transmitted by the nonlinear medium, such as a birefringent crystal. This phase conjugate waveform is then transmitted back along the incident optical path by conventional means.

In stimulated Brillouin scattering (SBS), an incident wavefront impinges upon the SBS device and sets up acoustic waves in the SBS medium. The acoustic waves are generated by electostriction wherein there is an interaction of the high intensity electric fields of the laser energy with the SBS medium. The electrostriction process is a spatial periodic modulated response which periodically modulates the density of the SBS medium, setting up acoustic waves in response to the electric field impulses. The acoustic waves that are set up in the SBS medium conform identically to the incident optical wavefronts and act as reflecting surfaces for the incident optical wavefronts which impinge upon these acoustic waves. Thus, the complex phase conjugate image of the incident optical wavefront is reflected. This prcess requires sufficient optical energy due to the existence of a power threshold for the stimulated condition in the SBS device. Any frequency or doppler shift due to the receding acoustic waves in the SBS medium is added to the reflected phase conjugate energy. This shift is usually very small in the order of one part in one hundred thousand and does not affect performance.

The photon echo process is similar to that of the SBS process except that the nonlinear medium is different. In the photon echo process, an incoming incident waveform incident upon the nonlinear medium deforms the medium. The interacting waves are all present at the same time in the medium. A laser pulse emitted by the external laser subsequently incident upon this deformed medium is reflected as the complex phase conjugate waveform of the incident incoming waveform.

It is to be understood that other types of phase conjugate gratings, such as thermal gratings, photo-refractive gratings, etc, are possible and the above is not meant as an all inclusive discussion of the types of phase conjugate gratings and/or wave mixing techniques.

It is often desirable to modulate phase conjugate beams such as for use in communications systems. Usually, this modulation is accomplished by modulating the writing beam such as shown in U.S. Pat. No. 4,496,222 of Shah. However, often there are applications where it is not desirable to modulate the source writing beam(s) in order to modulate the phase conjugate beam.

Accordingly, it is desirable to be able to modulate a phase conjugate beam without modulating the writing beam. Additionally, it is also desirable to modulate the phase conjugate beam by opto-optical means.

OBJECTS OF THE INVENTION

It is an object of the present invention to provide apparatus and method for modulating a phase conjugate beam. It is another object of the present invention to provide apparatus and method therefor for modulating a phase conjugate beam using opto-optical means. It is still another object of the present invention to provide means and method therefor for modulating a phase conjugate beam without modulating or effecting the writing beam.

Further objects and advantages of the present invention will become apparent as the following description proceeds and features of novelty characterizing the invention will be pointed out with particularity in the claims annexed to and forming a part of this specification.

SUMMARY OF THE INVENTION

Briefly, the present invention relates to apparatus and method therefor for modulation of a phase conjugate beam. A writing beam is directed incident to a phase conjugate reflector. The phase conjugate reflector as disclosed for example in U.S. Pat. No. 4,529,273 to Cronin-Golomb et al, is a suitable material in which gratings (phase gratings, amplitude gratings, etc.) can be induced or written by appropriate light intensities. Such materials include but are not limited to photorefractive crystals such as barium titanate, strontium barium niobate, lithium niobate, and potassium niobate. A modulating beam is also directed incident to the phase conjugate reflector for amplitude modulation of the phase conjugate beam. The modulating beam can also be steerable for effecting the amplitude of the phase conjugate beam according to spatial distribution so as to modulate the phase conjugate beam. The phase conjugate modulation is accomplished by opto-optical means. Said phase conjugate modulation is accomplished without modulation of or effect on the incident writing beam. Thus, the modulating beam acts on the phase conjugate gratings in the material which are generally complex, to change the characteristics of the gratings, e.g., to erase one or more of the gratings or spatially change the local energy density of the writing beam(s) in the material thereby changing, modifying, and/or altering the localized grating characteristics and parameters.

DESCRIPTION OF THE DRAWING

For a better understanding of the present invention reference may be had to the accompanying drawing which shows in:

FIG. 1, a diagrammatic representation of a prior art phase conjugate reflector of the self-pumped type utilized in one embodiment of the present invention and FIGS. 2 and 3, schematic illustrations of a phase conjugate modulator system embodying the prior art reflector diagrammed in FIG. 1.

DETAILED DESCRIPTION OF THE PREFERRED EMBODIMENT

The present invention relates to optical modulation of a phase conjugate beam and operates via spatially localized grating perturbation/erasure in suitable materials exhibiting phase conjugation such as nonlinear optical materials exhibiting self pumping and/or degenerate four wave mixing. Such materials include, by example and not by limitation, photorefractive ferroelectric barium titanate ($BaTiO_3$) which in the present embodiment is self-pumped and powered by the write beam as compared to reflector arrangements providing separately propagated imaging and powered pump beams applied to a nonlinear optical medium as disclosed in the Shah patent aforementioned. Other appropriate materials include artificial Kerr media such as dielectric microspheres, or photopolymers, photochromic materials, or thin films. Self-pumped (or passive) phase conjugation has been observed in $BaTiO_3$ and SBN (strontium barium niobate). Phase conjugation via degenerate four wave mixing has been observed in virtually all classes of materials including solids, liquids and gases if enough energy is applied to them, and/or appropriate beam geometries are incorporated.

Referring now to the drawing wherein like reference numerals have been applied to like members, there is shown in FIG. 1 of the drawing a representation of a prior art phaseconjugate reflector in the form of a poled single crystal of barium titanate 12 (or other suitable nonlinear polarization medium) exposed to a single incident writing light beam 14 of appropriate polarization impinging thereon so that light induced phase conjugate gratings are created within crystal 12 in a self-pumping mode, as disclosed in the Cronin-Golomb et al patent aforementioned such that a phase conjugate beam 16 of the input beam 14 is obtained. According to current theory, these light induced gratings are spatial variations of the refractive index which arise via the photorefractive effect of the interference patterns of the writing beam 14 inside the crystal material 12.

The modulator system 10 of the present invention as depicted in FIGS. 2 and 3 selectively wholly or partially erases said phase conjugate gratings by focussing a beam 18 of appropriate intensity from a modulating light beam source 19 onto these gratings in a direction approximately 90° to the plane of incidence of the writing beam(s) 14 from a laser 21 such that all and/or portions of the phase conjugate gratings are modified or erased thereby causing a corresponding modulation in the amplitude of the phase conjugate beam, the amplitude of which depends upon the strength of the phase conjugate gratings. Additionally, by steering the modulating light beam 18 so as to spatially scan the gratings induced by beam 14, the phase conjugate beam 16 is spatially modulated via the photorefractive interaction of the modulating light beam on the phase conjugate grating(s) in the material. In this manner, portions of the phase conjugate beam 16 can be amplitude modulated in a spatial plane. For example, the modification or erasure of a particular grating will decrease in intensity that portion of the phase conjugate beam which is attributable to that particular grating.

The present disclosed modulator system enables the modulation of the phase conjugate beam 18 from source 19 without modulation of or effect on the writing light beam 14 originating from a separate and independent laser source 21. Such a capability is useful in applications where it is desirable to amplitude modulate the phase conjugate beam but not modulate or effect the input writing beam as may be the case in optical communications and in fiber optic beam transmission.

As shown with reference to FIGS. 2 and 3, phase conjugate beam 16 can be steered or deflected using a beam splitter 20. Additionally, the spatial scanning of the modulating beam 18 onto the material 12 can be accomplished mechanically by scanning movement of a mirror 22 which can be accomplished with a servo motor under the control of a computer (not shown) in any manner well known in the art. In an alternative embodiment, instead of use of a mechanically moving mirror 22 for scanning the material 12, the steering of beam 18 can be accomplished by an opto-optical beam deflector and modulator (not shown) such as disclosed in U.S. patent application Ser. No. 06/057,994 filed June 4, 1987 having a common inventor, said patent application being expressly incorporated by reference herein. In this manner, the modulation beam 18 can not only be steered in order to spatially modulate the conjugate beam 16, but the beam 18 itself can be amplitude modulated thereby enhancing the dynamic range of modulation of the phase conjugate beam 16.

The laser beams as discussed herein can be produced by any appropriate laser source 21 such as an argon laser having a 5145 angstrom line or a He-Ne laser having a 6328 angstrom line both polarized with the electric vector along the crystal axis (extraordinary wave) and applied to the crystal in the self-pumped configuration depicted. The modulating laser beam 18 can be applied as either an extraordinary polarized, ordinary polarized, or elliptically polarized (including circularly polarized) wave normal to the top face of the crystal.

Thus there is presented structure and method for modulation of a phase conjugate beam. The writing beam 14 is directed incident to phase conjugate reflector 12. The modulating beam 18 is also directed incident to the phase conjugate reflector for amplitude modulation of the phase conjugate beam. The modulating beam can also be steerable through mirror 22 for effecting the amplitude of the phase conjugate beam according to spatial distribution so as to spatially modulate the phase conjugate beam. The phase conjugate modulation can thus accomplished by opto-optical means and without modulation of or effect on the incident writing beam 14. The modulation beam 18 itself can be amplitude modulated. The present invention is useful in applications where it is desirable to amplitude modulate the phase conjugate beam but not modulate or effect the input writing beam as may be the case in optical communications and in fiber optic beam transmission.

What is claimed is:

1. A phase conjugate beam modulator system, comprising: phase conjugate reflector means for reflecting a writing beam incident thereupon as a phase conjugate beam, and optical modulating means directing a modulating light beam incident upon the reflector means for modulation of the phase conjugate beam independently of the writing beam.

2. The system of claim 1 wherein the reflecting means is self-pumping.

3. The system of claim 1 further comprising means for steering the modulating light beam.

4. The system of claim 1 further comprising means for steering the phase conjugate beam.

5. The system of claim 1 wherein the modulating light beam is amplitude modulated.

6. In combination with a self-pumped, phase conjugate reflector device having a radiation incident surface; a method of amplitude modulating a phase conjugate beam derived from a single input beam of coherent radiation passing internally through the reflective device, including the steps of: selectively applying the input beam to the reflector device through said incident surface along an intersecting path common to the phase conjugate beam propagated in a reverse direction from the reflection device; and applying a modulating beam independent of the input beam to the reflector device along a separate path substantially perpendicular to a plane at right angle to said incident surface to modulate the phase conjugate beam without affecting the input beam externally of the reflector device.

7. The method of claim 6 including the step of: selecting an angle of incidence between the input beam and the incident surface to establish said common path for th input beam and the phase conjugate beam externally of the reflector device.

8. The method of claim 7 including the step of: deflecting the modulated phase conjugate beam externally of the reflector device from the common path.

9. The method of claim 6 including the step of: deflecting the modulated phase conjugate beam externally of the reflector device from the common path.

* * * * *